Figure 1:
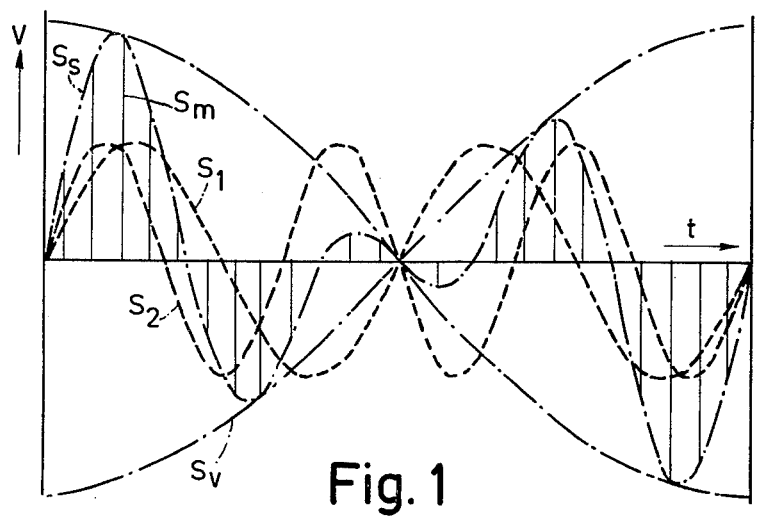

United States Patent [19]
Buchner et al.

[11] 3,976,843
[45] Aug. 24, 1976

[54] MFC RECEIVER DIGITAL SIGNAL PROCESSING

[75] Inventors: Robert Bertold Buchner; Jan Philippus Maat, both of Hilversum, Netherlands

[73] Assignee: U.S. Philips Corporation, New York, N.Y.

[22] Filed: Dec. 4, 1974

[21] Appl. No.: 529,289

[30] Foreign Application Priority Data
Dec. 12, 1973 Netherlands .................. 7316990

[52] U.S. Cl. ............................................ 179/15 BY
[51] Int. Cl.² ...................................... H04Q 11/00
[58] Field of Search ........ 179/15 BY, 15 AT, 84 VF

[56] References Cited
UNITED STATES PATENTS

| | | |
|---|---|---|
| 3,066,193 | 11/1962 | Brightman .................... 179/15 BY |
| 3,151,219 | 9/1964 | Ellis et al. ..................... 179/15 BY |
| 3,223,783 | 12/1965 | Yamamoto et al. ............ 179/84 VF |
| 3,710,028 | 1/1973 | Pitroda .......................... 179/15 BY |
| 3,801,746 | 4/1974 | Buchner ........................ 179/15 BY |
| 3,863,030 | 1/1975 | Mills ............................. 179/15 BY |

*Primary Examiner*—Douglas W. Olms
*Attorney, Agent, or Firm*—Frank R. Trifari; Daniel R. McGlynn

[57] ABSTRACT

A multi-frequency code receiver which determines, by the determination of the sum signal frequencies, tone frequencies of sampled tone signal frequency combinations received in digital form by selecting nominal sum signal frequencies for the received sum signals in dependence of a criterion which determines whether or not the amplitude of the tone signal frequency of the lowest value exceeds the amplitude of the tone signal frequency of the highest value.

18 Claims, 17 Drawing Figures

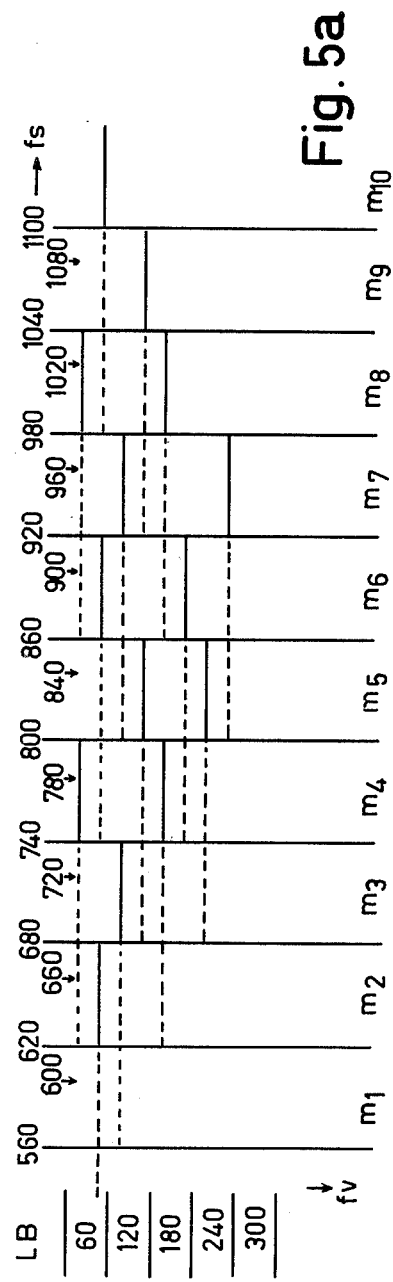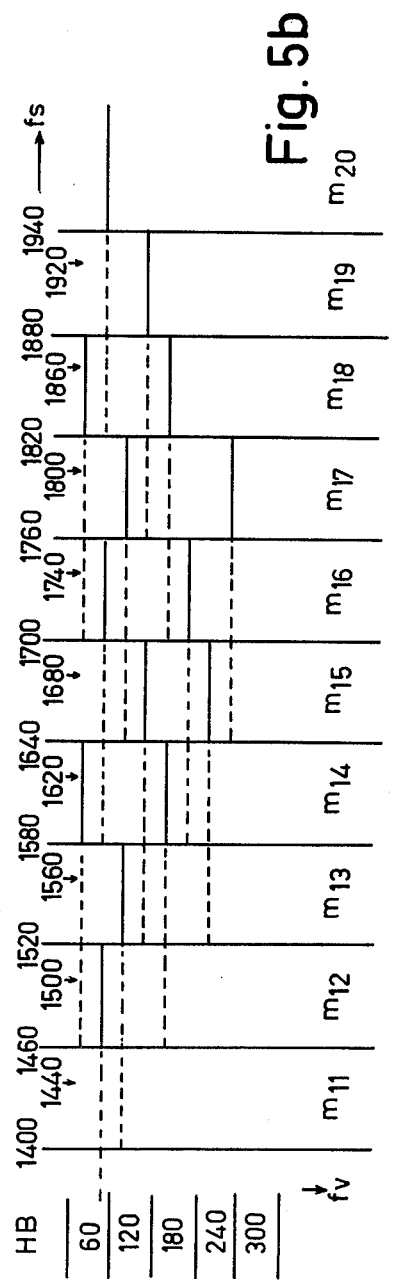

MFC RECEIVER DIGITAL SIGNAL PROCESSING

The invention relates to a multi-frequency code receiver for determining at least two tone signals of a group of multi-frequency tone signals received in sampled form, comprising a combination of a. an electronic digital computer which is programmed such that the tone signal frequencies are determined by the detection of the sum signal frequency and the beat signal frequency, b. a signal frequency indicator which is connected to the computer and which serves to record signals which are applied thereto by the computer and which are representative of the tone signal frequencies, and c. a switching device having connected thereto the computer in order to apply samples represented in digital form to the computer.

Such a multi-frequency code receiver (MFC receiver) is intended to be used, for example, in end-to-end register signalling networks between end exchanges in telephony systems. The contemporary signalling networks, including the MFC receivers incorporated therein, are adapted for the analog processing of analog multi-frequency code signals, to be referred to hereinafter as tone signals.

In time multiplex switching systems, information signals are preferably transmitted in a digital sampled form; this is also applicable to tone signals used in such systems.

The use of MFC receivers which process the tone signals in analog manner, requires a digital-to-analog converter per receiver, each receiver per se being rather large. Therefore, S. G. Pitroda proposed an MFC receiver which digitally processes the signals. This MFC receiver is described on pages 143–444 of the conference papers of the International Switching System Conference, held in June 1972 in Massachusetts.

The receiver described therein determines, by mutual comparison of the amplitudes of the received samples, the samples which are situated in the peaks of the sum signal composed of the two tone signal frequencies and, by amplitude comparison of these selected samples, the samples which are situated in the peaks of the beat signal of the said two tone signal frequencies. The sum signal and the beat signal frequencies are determined by measuring the times between the selected samples, and the frequencies of the two tone signals are derived therefrom.

Besides the occurrence of detection errors caused by drift of the signal generators, noise, and signal interruptions caused by interference, the major drawback of this receiver is that the detection of tone signal frequencies is possible only if the amplitude of the tone signal having the lower signal frequency does not exceed the amplitude of the tone signal having the higher signal frequency.

These drawbacks are eliminated according the the invention, which has for its object to realize a digital MFC receiver which is capable of detecting tone signals satisfying the requirements stated in the "Detailed Specification of Signalling System R2, 1969", as regards frequency drift, absolute power and maximum admissible amplitude difference between the two tone signals.

The MFC receiver according to the invention is characterized in that the computer is further programmed such that, upon reception of samples applied in digital form, the computer selects the sample having the highest amplitude received thus far, calculates the location of a fictitious zero crossing of the sum signal of each two successively received samples of different sign, calculates the times between successive zero crossings on the basis thereof, selects the longest time calculated thus far from the times calculated during a given measuring period, selects the times which are situated in the maxima of the beat signal, calculated a selected quotient of the longest time determined thus far and one of the selected times, and determines the sum signal frequency on the basis of the selected times in dependence of the fact whether or not the calculated quotient satisfies a predetermined first value.

The invention and its advantages will be described in detail hereinafter with reference to the Figures.

Figure 2A:
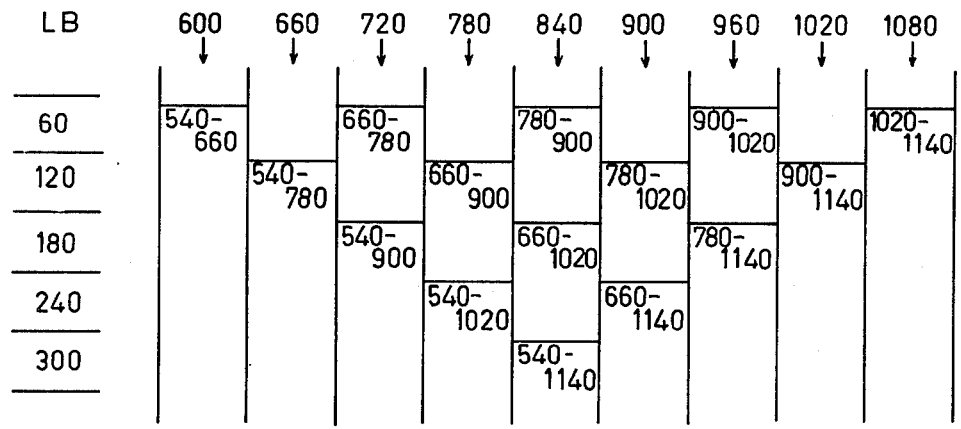
Figure 2B:
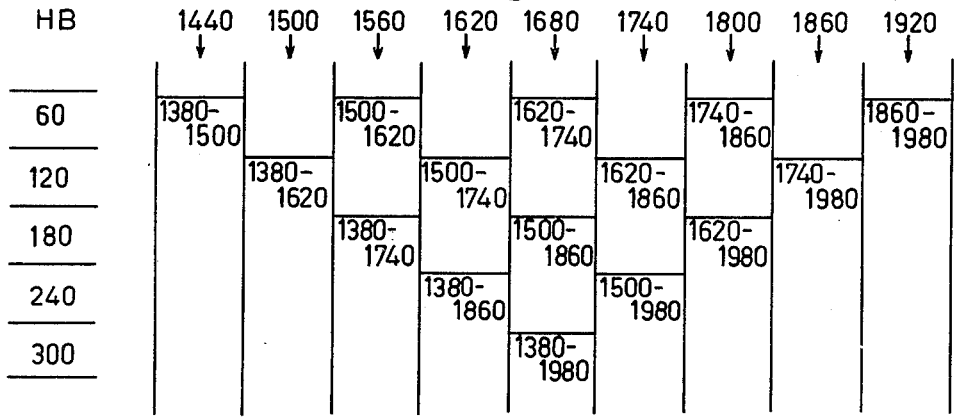
Figure 3:
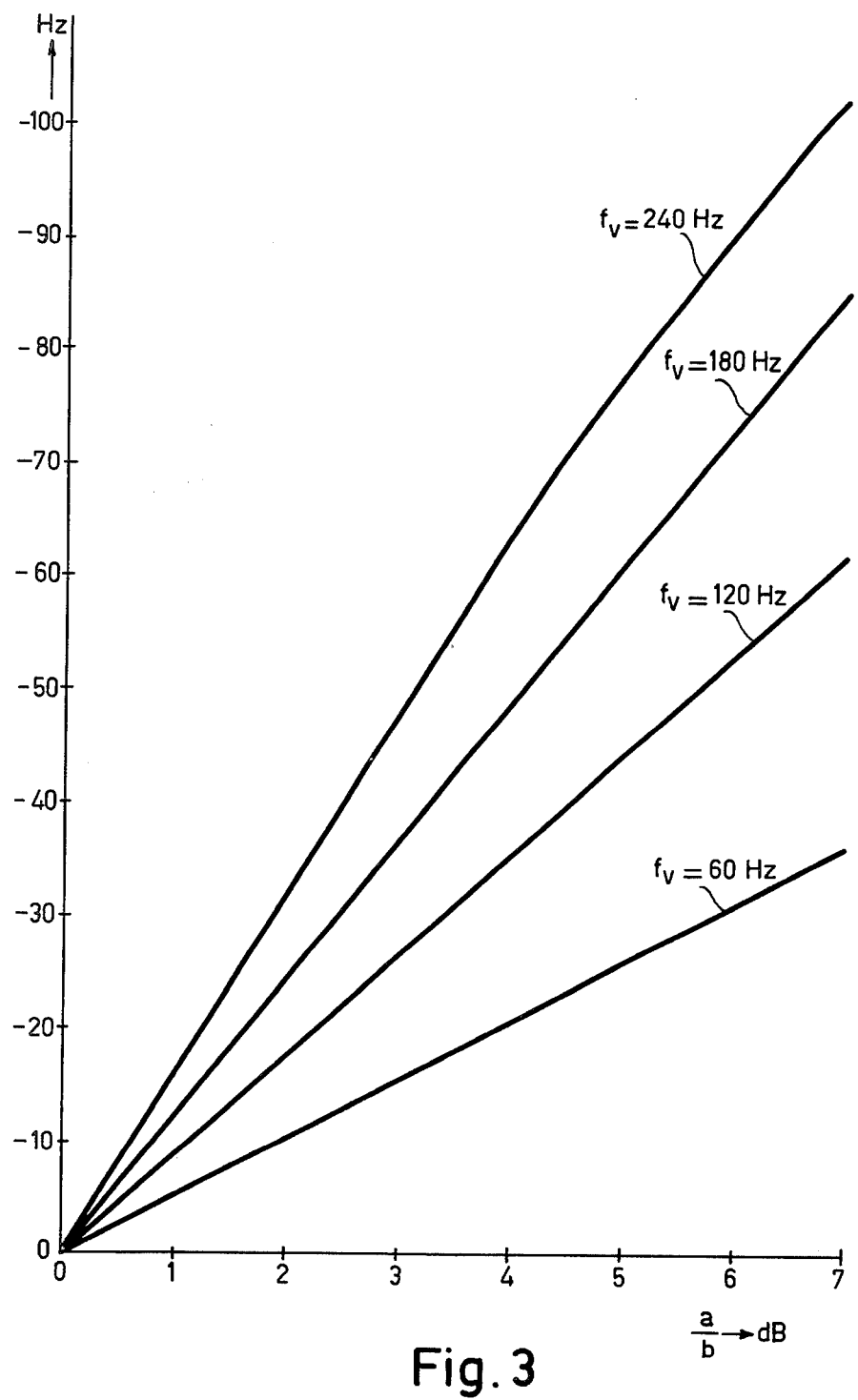
Figure 6:
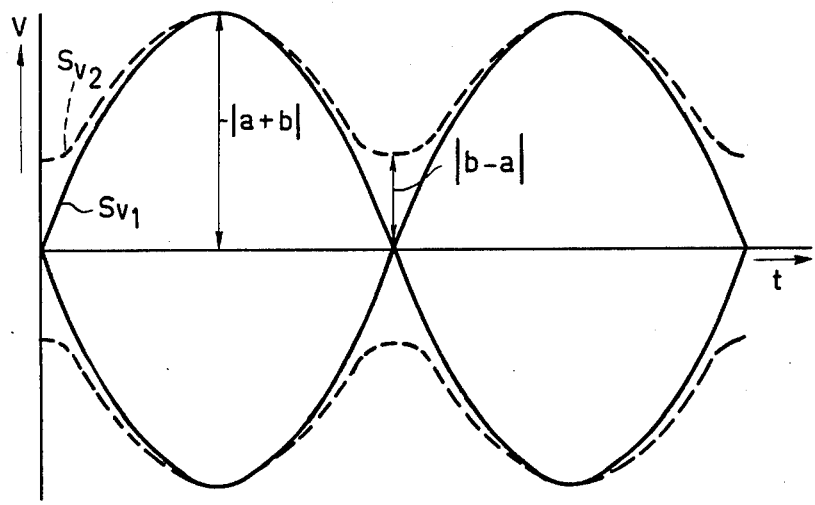
Figure 7:
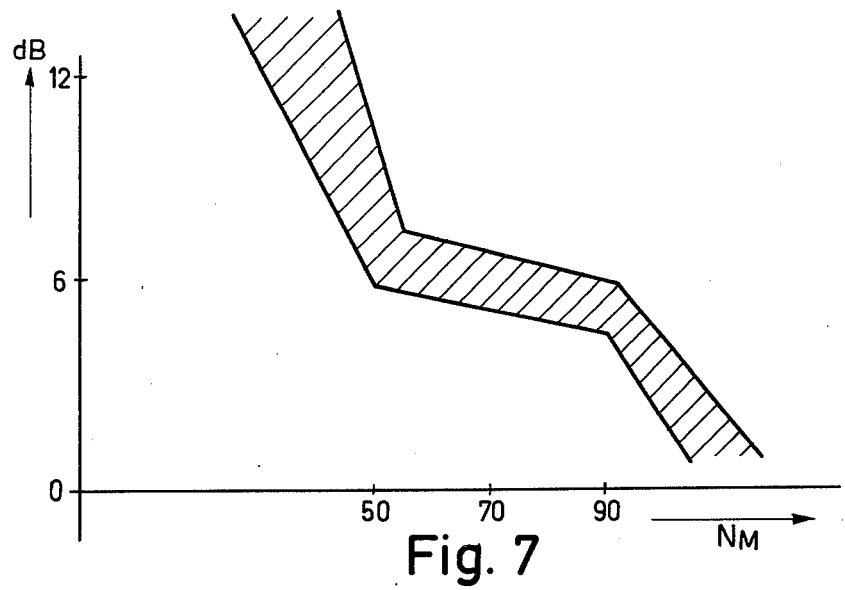
Figure 8:
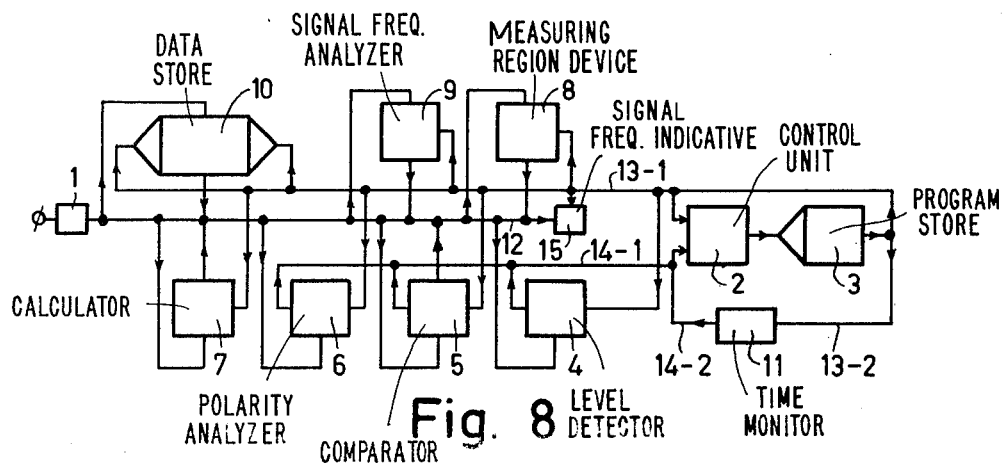
Figure 9:
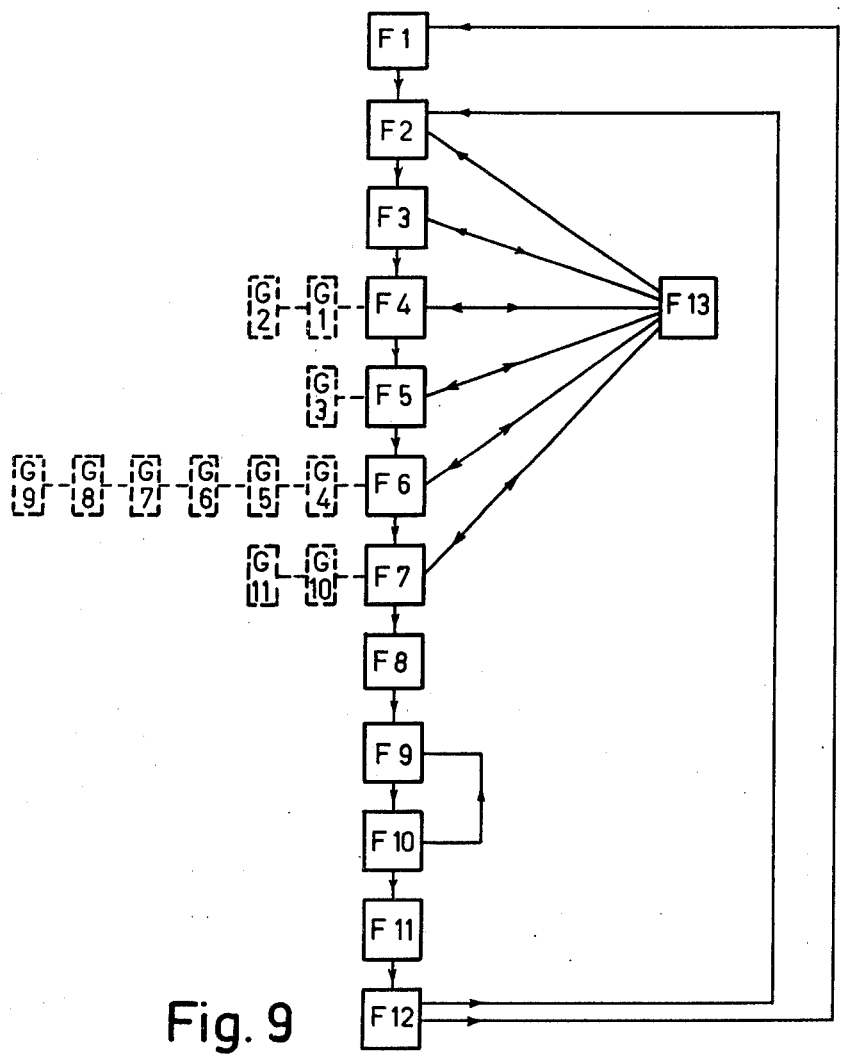
Figure 10:
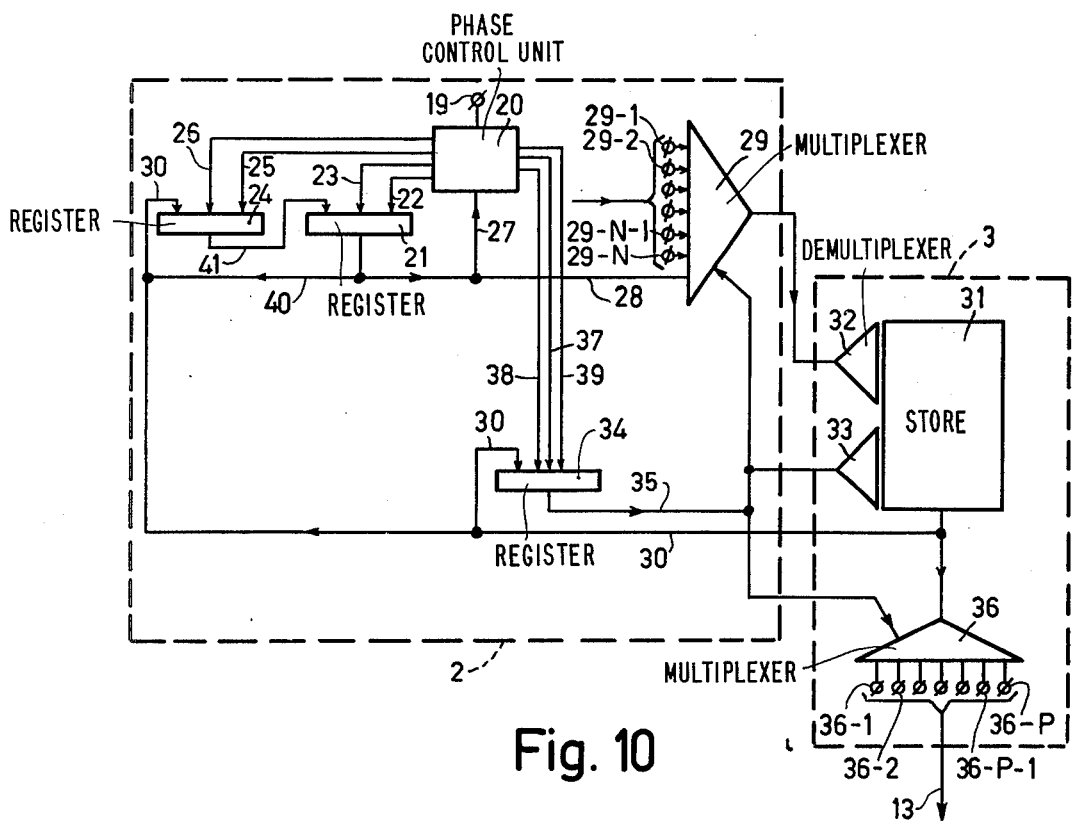
Figure 11:
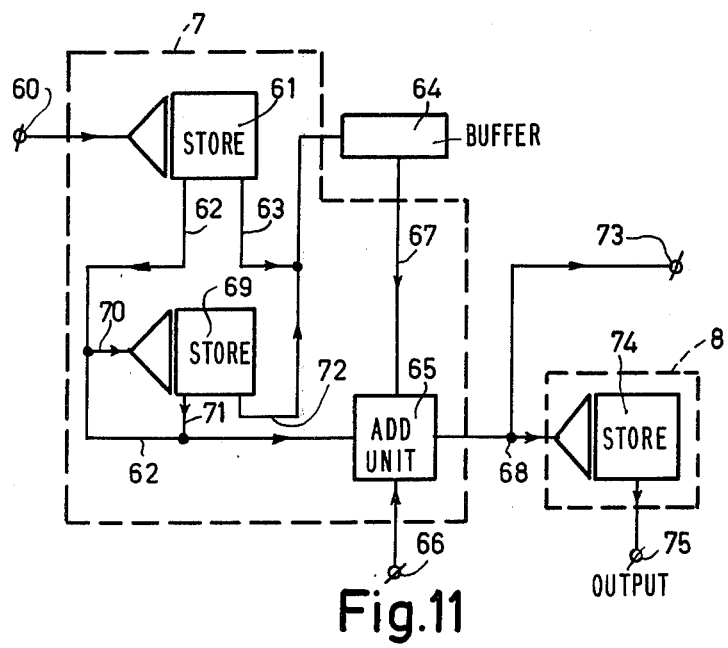

FIG. 1 shows an example of tone signals represented in sampled form and the associated analog tone signals, the analog sum signal, and the analog beat signal, FIGS. 2a and 2b show tables of sum signal and beat signal frequencies associated with specific nominal tone signal frequencies, FIG. 3 shows graphs of the deviation of a detected sum signal frequency from a nominal sum signal frequency as a function of the amplitude ratio of the two tone signals constituting the sum signal, FIGS. 4a and 4b show examples of the wave form of a sum signal as a function of the time for different amplitude ratios of the two tone signals constituting the sum signal, FIGS. 5a and 5b show two tables containing values of sum signal and beat signal frequencies which have been corrected for the amplitude difference between two tone signals, FIG. 6 shows beat signals of specific tone signals plotted versus the time, FIG. 7 shows a graph in which the number of samples of given amplitude received in a given time are plotted versus the amplitude difference in dB for two tone signals, FIG. 8 shows an embodiment of an MFC receiver according to the invention, FIG. 9 shows a diagram in which the successive operating phases of the MFC receiver according to the invention are given, FIG. 10 shows a part of the embodiment of an MFC receiver according to the invention shown in FIG. 8, FIG. 11 shows another part of the embodiment of an MFC receiver according to the invention shown in FIG. 8, and FIGS. 12, 13a and 13b show further tables of the sum signal and beat signal frequencies associated with specific nominal tone signal frequencies.

The embodiment of the MFC receiver shown in FIG. 8 is adapted for use in a special register signalling system which is used in national connections for direct signalling between and exchanges and which is used in international connections for direct signalling between an end exchange and, where necessary, a special register for the coupling of two national networks such as is effected, for example, in an international exchange. This signalling system utilizes two different frequency bands which are situated within the band of the speech channel. In each of these bands six tone signals are situated. For the transmission of an information element two tone signals of one and the same band are combined. The tone signal frequencies situated in the higher one of the two bands are exclusively used for signalling in the forward direction, and those situated in the lower frequency band are exclusively used for signalling in the return direction. As a result, this signalling can also be used in the case of two-wire connections. Furthermore, for this signalling use is made of a so-termed "forced signal procedure", which means that the transmission of a code signal is stopped only after acknowledgement of signal reception has been received from the other end.

These tone signals are transmitted in a digital sampled form in time multiplex systems, an internationally standardized sampling repetition frequency of 8 KHz being used for this purpose.

An example of a signal sample is denoted in FIG. 1 by the uninterrupted line $S_m$. The broken lines $S_1$ and $S_2$ in this Figure denote the tone signals in analog form represented by the samples, and the stroke-dot lines represent the sum signal $S_s$ and the beat signal $S_v$ associated with the tone signals $S_1$ and $S_2$. The MFC receiver of FIG. 8 determines the sum signal frequency and the beat signal frequency on the basis of the samples $S_m$ in a manner yet to be described, and the tone signal frequencies are determined on the basis of these frequencies.

Two groups of reception conditions of tone signals for MFC receivers have been established, i.e. for a type-A receiver:

A frequency tolerance in the generation of the tone signals of maximum ± 5 HZ.

A reception level of from −5 dBm to −20 dBm

A level difference between two tone signals of a combination of maximum 3 dB for a type-B receiver:

A frequency tolerance in the generation of the tone signals of maximum ± 10 HZ

A reception level of from −5 dBm to −35 dBm

A level difference between two adjoining tone signals of a combination of maximum 5 dB, and a level difference between two non-adjoining tone signals of a combination of maximum 7 dB.

The manner in which tone signal frequencies are determined will be described hereinafter with reference to tone signal frequencies which have been commonly established by a number of European countries. The tone signal frequency combinations of this European system are given in the tables of the FIGS. 2a and 2b. The tone signal frequency combinations used for the return signalling direction are situated in the lower frequency band shown in FIG. 2a, whilst the tone signal frequency combinations used for the forward direction are situated in the higher frequency band shown in FIG. 2b. The number given at the beginning of each row of the tables denotes the beat signal frequency, and the number given above each column of the tables denotes the sum signal frequency of the signal frequency combination (combinations) stated in the relevant row or column.

The Determination of the Sum Signal Frequency

In accordance with one step taken according to the invention, the sum signal frequency is determined from the zero crossings of the fictitious analog sum signal $S_s$ (see FIG. 1). To this end, it is first determined whether or not two successively received samples have a different sign. For such a set of samples the time of 125 $\mu$s (sample repetition frequency is 8 KHz) between these samples is divided into portions proportional to the amplitudes of these samples. The location of a zero crossing of the fictitious analog sum signal is thus determined with respect to the location of these samples in the time. Furthermore, the number of samples is counted which is received between two successive times that two successive samples of different sign are received. This number, increased by one, is subsequently multiplied by the sample repetition time of 125 $\mu$s, and the time portions are added thereto which are proportional to the amplitudes of the second sample of the first time and of the first sample of the second time of the said two successive times that two successive samples of different sign are received within which the counted number of samples is located.

In accordance with a further step taken according to the invention, only the times between two successive zero crossings in which a maximum of the beat signal is located are used for the determination of the sum signal frequency. This step will be described with reference to the formula $$F_s(t) = a \sin(\omega_1 t) + b \sin(\omega_2 t + \phi)$$

which is representative of an MFC signal. Therein, $a$ and $b$ are the amplitude factors and $\omega_1$ and $\omega_2$ are angular frequencies of two tone signals of a tone signal frequency combination. Furthermore, $\phi$ is a phase angle which arbitrarily occurs between these tone signals and which is chosen to be equal to zero hereinafter for the sake of simplicity. Furthermore, it is assumed that $\omega_2$ is always larger than $\omega_1$. The above formula can be elaborated as follows:

$$F_s(t) = \frac{a+b}{\cos \phi \, t} \cos\left[\left(\frac{\omega_1 - \omega_2}{2}\right) t\right] \sin\left[\left(\frac{\omega_1 + \omega_2}{2}\right) t - \phi(t)\right] \quad (I)$$

where $$tg\, \phi(t) = \left[\frac{b-a}{b+a}\right] tg\left[\left(\frac{\omega_1 - \omega_2}{2}\right)\right] t \quad II$$

Formula I shows that the sum frequency component is phase modulated, and formula II shows that this phase modulation $\phi(t)$ is a function of the beat signal frequency. For $$\left(\frac{\omega_1 - \omega_2}{2}\right) t = K \pi \quad III$$

the phase $\phi(t)$ equals zero, and for $$\left(\frac{\omega_1 - \omega_2}{2}\right) t = \frac{\pi}{2} + K \pi, \quad IV$$

the phase $\phi(t)$ is maximum.

If formula III is satisfied, it follows from formulas I and II that the beat signal is maximum. It is thus demonstrated that by the step according to which only the times between two successive zero crossings in which a maximum of the beat signal is situated are used for the sum signal frequency determination, it is achieved that the deviation of the sum signal period time caused by the phase modulation is minimum.

The selection of times situated between two successive zero crossings and within which a maximum of the beat signal is situated is effected according to a further step according to the invention by the continuous determination of the signal having the highest amplitude received thus far, and by selecting, during a given measuring period of, for example, 25 ms, the times in which at least one sample is received having an amplitude in excess of 0.93 times the amplitude of the sample having the highest amplitude received thus far, or in which at least two samples are received having an amplitude in excess of 0.83 times the amplitude of the sample having the highest amplitude received thus far for the tone signals situated in the lower band or in excess of 0.70 times the amplitude of the sample having the highest amplitude received thus far for the tone signals situated in the higher band. On the one hand, these requirements result from the fact that the situation of this sample with respect to the sum signal as well as the situation of the sum signal with respect to the beat signal can have any arbitrary value, whilst on the other hand these requirements result from the fact that the periods of the tone signals situated in the higher frequency band are smaller than the periods of the tone signals situated in the lower frequency band, with the result that a separate amplitude criterion must be used for each band in order to achieve unambiguous determination of the location of a time between two successive zero crossings in which a maximum of the beat signal is situated.

It is to be noted that for frequency combinations producing the highest tone signal frequencies, it may be that two successively received samples having amplitudes in excess of 0.70 times the amplitude of the sample having the highest amplitude received thus far are detected, these samples being situated in two successive half periods of the said sum signals. In order to eliminate these samples during the selection of the times within which a peak of the beat signal occurs, it is also determined whether or not besides a said amplitude criterion the condition is also satisfied that these samples must have the same sign.

It is further to be noted that in the case of tone frequency signal combinations having a beat signal frequency of 240 Hz and being situated in the lower band it may occur that two successive peaks of the sum signal appear, each peak containing at least one sample having an amplitude in excess of 0.83 times the amplitude of the sample having the highest amplitude received thus far, a bending point being situated between these peaks. Due to this bending point, a zero crossing is lacking between the said two successive peaks, with the result that the time measured between the two successive zero crossings does not correspond to the period time of the sum signal. However, this time is still selected. In order to eliminate these incorrect times from the further measurement, according to a further step taken in accordance with the invention it is determined whether each newly selected time is smaller than 0.8 times the time (times) selected thus far. If this is so, the previously selected time (times) is (are) excluded from the further signal determination.

It appears from the tables given in the FIGS. 2a and 2b that the nominal sum signal frequencies for the various tone signal frequency combinations differ 60 Hz with respect to each other. This means that in the case of a frequency deviation of the sum signal frequency to be detected of up to ± 30 Hz from the nominal sum signal frequency, this nominal sum signal frequency can still be unambiguously determined. However, a much larger frequency deviation occurs. The major causes thereof are:

a. The approximation of the shape of a sinusoidal curve by a straight line during the determination of the time portions of the time between two successive samples of different sign.

b. The unequality of the amplitudes of the two tone signals of an MFC signal.

c. The frequency drift occurring in the tone signal generators.

The approximation mentioned sub a) produces a maximum error of 0.65% or 7 Hz for the tone signal frequencies used in the return direction and situated in the lower band, and a maximum error of 4% or 38.4 Hz for the tone signal frequencies used in the forward direction and situated in the higher band. From this it follows that correction makes sense only for the tone signals situated in the higher band. The extent of the correction would have to be different for each tone signal frequency combination so as to obtain an optimum result. However, the tone signal frequency combinations are still unknown in this phase of the detection.

According to a further step taken in accordance with the invention, the calculated portions of the selected sample repetition time occurring between two successive samples of different sign are corrected, this correction being optimum for 1680 Hz. This correction is the same for each tone signal frequency combination, but offers maximum compensation for the sum signal frequencies of 1620 Hz and 1740 Hz. This choice is based on recognition of the fact that these sum signal frequencies are most difficult to distinguish from each other; this will be explained hereinafter.

Using the formulas I and II, it was already demonstrated that the sum signal is phase modulated as a function of the beat signal and that, consequently, the difference between the nominal sum signal frequency and the instantaneous sum signal frequency varies from zero from the instantaneous sum signal component situated in the maximum of the beat signal to a maximum value for the instantaneous sum signal component situated in the minimum of the beat signal. The sum signal frequency calculated from a selected time thus has a maximum frequency deviation from the nominal sum signal frequency if one of the zero crossings associated with the said selected time is situated as far as possible from the maximum of the beat signal. Because the zero crossing of a selected time can never be situated further than the period time of this sum signal from the maximum of the beat signal, the maximum frequency shift occurs for the highest beat signal frequency because the period time of the sum signal then has the comparatively largest effect. However, FIG. 2b shows that there is only one tone code signal combination having the highest beat signal frequency, with the result that this signal combination is unambiguously determined by the beat signal frequency, independent of the value of the instantaneous frequency of the sum signal. However, there are two frequency combinations having the same highest but one beat signal frequency, so that these two have to be distinguished from each other by the sum signal frequencies to be detected. These are the tone signal frequency combinations 1380 – 1860 Hz and 1500 – 1980 Hz which both have the beat signal frequency of 240 Hz and the sum signal frequencies of 1620 Hz and 1740 Hz. Because of the fact that, as was demonstrated, these sum signal frequencies can have the largest frequency shift with respect to the nominal sum frequencies upon detection, it makes sense to make an optimum correction of the frequency error caused by the approximation of a sinusoidal curve by a straight line for these frequencies in order to keep the overall frequency shift as small as possible.

In order to enable these corrections to be performed, it must already be known whether the tone signal frequencies are situated in the higher or in the lower frequency band. Therefore, in accordance with a further step taken according to the invention, the period times of the sum signal are determined during a time of, for example, 13 ms immediately preceding the given measuring time of 25 ms in the same manner as described above, without corrections being performed thereon but selection being effected, it subsequently being determined whether these period times are smaller than 390.5 $\mu$s. This is because this time equals half the period duration associated with a frequency situated halfway between the lowest sum signal frequency of the higher band and the highest sum signal frequency of the lower band. It is to be noted that the distance between the highest sum signal frequency of the lower band and the lowest sum signal frequency of the higher band amounts to six times the distance between two successive sum signal frequencies situated in one band. It is thus precluded that the frequency shift produced by the described causes and the causes yet to be described can give rise to incorrect determination of the band.

The extent of the frequency shift, however, is mainly determined by the cause mentioned sub b), involving the possible amplitude unequality of the two tone signals of an MFC signal. The influence of the amplitudes of the signal frequencies on the phase of the sum signal follows directly from formula II. For equal amplitudes, i.e. for $a=b$, the phase modulation is zero. As the amplitude difference increases, this modulation linearly increases. It is to be noted that for $a > b$, $\phi(t)$ is positive and that for $a < b$, $\phi(t)$, is negative. Because according to formula I, $\phi(t)$ is subtracted from the sum signal phase $$( \frac{\omega_1 + \omega_2}{2} ) t,$$

the period of the sum signal situated in the maximum of the beat signal is increased if $a > b$, and is decreases if $a < b$. This means that for $a > b$ the zero crossings of the sum signal may be situated further from the maximum of the beat signal than for $a < b$, with the result that the maximum frequency shift of the instantaneous sum signal with respect to the nominal sum signal frequency is larger for $a > b$ than for $a < b$. In the graph shown in FIG. 3, the frequency shift is shown in Hz as a function of the amplitude ratio of the two tone signal frequencies present per MFC signal for ratios of $b/a$ smaller than one. The curves denoted by the beat signal frequencies $f_v$ are applicable to the tone signal combinations of the lower band which have the lowest sum signal frequencies at the indicated beat signal frequencies (see table 2a). This graph does not show the curve for the tone signal frequency combination producing the highest sum signal frequency, because it was already explained that this frequency is unambiguously determined by detection of the beat signal frequency. This graph furthermore shows that, as has already been explained, the frequency shift increases both as the beat signal frequency increase and as the amplitude difference increases. The maximum frequency shift occurring for an amplitude ratio of 6 dB is, therefore, $\approx$90 Hz.

The maximum deviation of the sum signal frequency caused by the drift of the tone signal generators mentioned sub c) is $\pm$ 20 Hz.

It follows from the foregoing that the possible deviation of a detected sum signal frequency with respect to the nominal sum signal frequency is much larger, even ignoring errors caused by noise and signal interruptions, than the frequency range of $\pm$ 30 Hz which is present around each nominal sum signal frequency and within which sum signal frequencies are unambiguously determined.

The invention has for its object to determine with which nominal sum signal frequency sum signal frequencies having the above large frequency deviations are associated.

This is realized according to the invention by selecting the longest time from all times calculated thus far during the given measuring time of 25 ms, by calculating a selected quotient of the selected longest time and one of the selected times, and by determining from the selected times the nominal sum signal frequency in dependence of the fact whether or not the calculated quotient equals a predetermined first value amounting to 1.15.

The invention is based on recognition of the fact that on the one hand the nominal sum signal frequencies differ 120 Hz with respect to each other for the signal frequency combinations which are situated in the same band and which have the same beat signal frequency, as appears from the tables of the FIGS. 2a and 2b, whilst on the other hand the described step makes it possible to determine, when a detected sum signal frequency is situated between two successive nominal sum signal frequencies, with which of these two nominal sum signal frequencies the detected frequency is associated.

It was already demonstrated that for $a < b$ the period of the sum signal is reduced and that for $a > b$ the period of the sum signal is increased. This means that for $a < b$ the detected sum signal frequency is larger than the nominal sum signal frequency, and that for $a > b$ the detected sum signal frequency is smaller than the nominal sum signal frequency. From this it follows that, if it can be determined whether $a > b$ or $a < b$ upon detection of a sum signal frequency, the detected sum signal frequency is associated with the nominal sum signal frequency situated directly above or directly below this frequency, respectively. $a > b$ or $a < b$ is determined by the said step.

This step will be described in detail with reference to the sum signals $S_{a > b}$, $S_{a = b}$ and $S_{a < b}$ shown in the FIGS. 4a and 4b.

Figure 4:
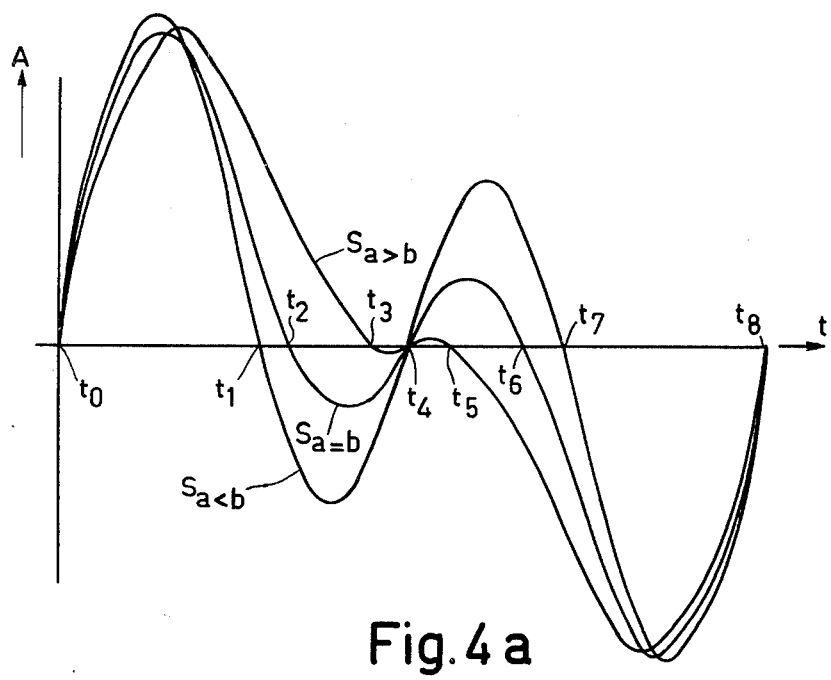
Figure 4:
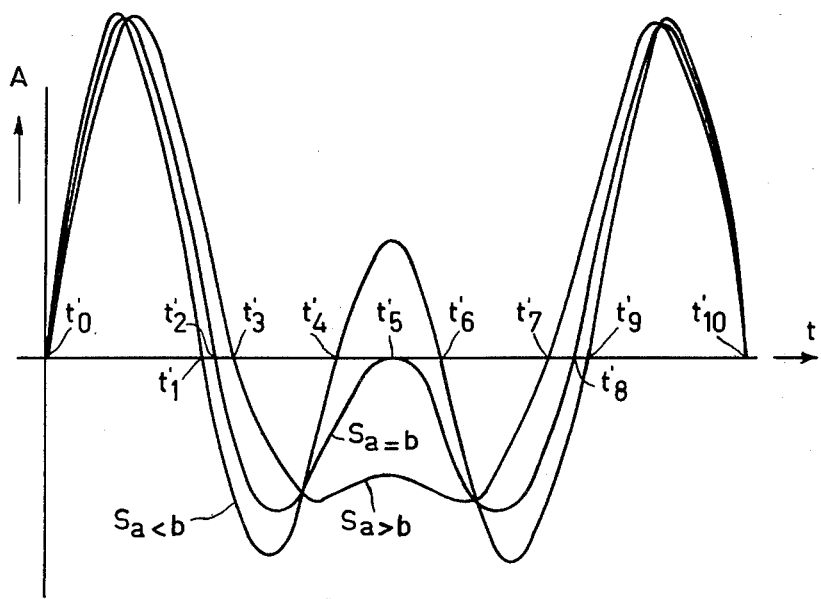

The sum signals shown in each of these Figures are composed of two tone signals having a frequency ratio which is the same per Figure, and an amplitude ratio which differs per sum signal, it being assumed that the tone signals are in phase in the maximum of the beat signal occurring at instant $t_o$ in FIG. 4a and $t_o'$ in FIG. 4 b.

The tone signals associated with the sum signals given in FIG. 4a have frequencies which relate as one to two, with the result that in the minimum of the beat signal, occurring at the instant $t_4$, the sum signals have a zero crossing. The tone signals associated with the sum signals shown in FIG. 4b have frequencies which relate as three to five, with the result that in the minimum of the beat signal, occurring at the instant $t_5'$, the sum signals have a bending point. Furthermore, the amplitude $a$ of the tone signal having the lowest frequency and the amplitude $b$ of the tone signal having the highest frequency relate as one to two for the sum signals $S_{a < b}$, as one to one for the sum signals $S_{a = b}$, and as two to one for the sum signals $S_{a > b}$.

FIG. 4a shows that the zero crossings, situated on both sides of the minimum of a beat signal and occurring at the instants $t_1$ and $t_7$ in the case of an amplitude ratio $a/b = \frac{1}{2}$, are situated nearer to the minimum of this beat signal as the value of the ratio $a/b$ increases, so that they occur at the instants $t_2$ and $t_6$ in the case of a ratio $a/b = 1$, and at the instants $t_3$ and $t_5$ in the case of a ratio $a/b = 2$. If these signals are sampled by a signal having a sample repetition time smaller than the time between the instants $t_1$ and $t_4$ or $t_4$ and $t_7$, at least one sample will be situated between each two successive zero crossings of the sum signal $S_{a < b}$. This means that during a determination of the zero crossings of such a sum signal received, each zero crossing of this signal is detected in the described manner and that between two successive zero crossings no times are detected which are larger than the time in the vicinity of the maximum of a beat signal between the instants $t_0$ and $t_1$, or $t_7$ and $t_8$. If, moreover the sampling repetition time is chosen to be larger than the time between the instants $t_2$ and $t_4$ or $t_4$ and $t_6$, and if the sample repetition frequency amounts to a non-rational multiple of the sum signal frequencies, the shifting of the situation of the samples with respect to the sum signal will be the cause that in a given time it will occur at least once that between the instants $t_2$ and $t_4$ or between the instants $t_4$ and $t_6$ no sample is situated, which implies that in this case the zero crossings $t_1$ and $t_4$ or $t_4$ and $t_6$ are not detected, with the result that between two successive zero crossings a time is detected which equals the time between the instants $t_0$ and $t_7$ or between the instants $t_2$ and $t_8$.

The sum signals shown in FIG. 4b exhibit the same shift pattern of the situation of the zero crossings as already described with reference to FIG. 4a. However, because of the special frequency ratio of the tone signals constituting the sum signals a different effect occurs. This Figure shows that the amplitude of the sum signal changes from a high positive value for a ratio $a/b = \frac{1}{2}$, via a value equal to zero for a ratio $a/b = 1$, to a high negative value for a ratio $a/b = 2$. This means that upon variation of the ratio $a/b$ from $\frac{1}{2}$ to 2, the zero crossings occurring at the instants $t_4'$ and $t_6'$ first move towards each other until they coincide at the instant $t_5'$, and that they subsequently disappear. If the sum signals are sampled by a signal having a sample repetition time which is smaller than the time between the instants $t_4'$ and $t_6'$, at least one sample will be situated between each two successive zero crossings of the sum signal $S_{a}$ $_{b}$. This means that the time determined from two successively detected zero crossings can never exceed the time in the vicinity of the maximum of the beat signal between the instants $t_0'$ and $t_1'$ or between the instants $t_9'$ and $t_{10}'$. For a larger ratio of $a/b$, either the part of the sum signal situated above the zero line in the vicinity of the minimum of the beat signal is so narrow that, due to the shifting of the signal samples with respect to the sum signal in the case of a nonrational relationship of the sample repetition frequency and the sum signal frequency, it will occur at least once in a given time that no sample is situated between the instants $t_4'$ and $t_6'$, with the result that these zero crossings are not detected, or these zero crossings do not occur at all. As a result, a time is detected between two successive zero crossings which at least equals the time between the instants $t_3'$ and $t_7'$. The above effects are also applicable to an arbitrary phase between the sum signals and/or a different frequency ratio of these tone signals. It follows from the foregoing that by comparison of the longest time detected between two successive zero crossings during a given measuring time with the selected times in the maximum of the beat signal it can be determined whether $a < b$ or $a \geq b$.

For the sum signal frequencies used in the European MFC system and the internationally standardized sample repetition frequency of 8 KHz, it has been statistically demonstrated that for a ratio $a/b$ of 0.8 db and less no times are found between successively detected zero crossings which exceed 1.15 times the time measured between two successive zero crossings within which a maximum of the beat signal is present. If a value in excess of 1.15 is found once during the entire measuring time of 25 ms, $a \geq b$.

The determination of a nominal sum signal frequency utilizing a detected sum signal frequency for which it is known that $a < b$ or that $a \geq b$ will be explained on the basis of the tables given in the FIGS. 5a and 5b. In these tables, for the lower band LB as well as for the higher band HB a frequency scale $f_s$ is horizontally plotted within which the detected sum signal frequencies are situated, while in the vertical direction the beat signal frequencies $f_v$ are plotted, separated from each other by strokes. The sum signal frequencies are divided into measuring regions $m_1$ to $m_{20}$ by vertical lines. Each measuring region $m$ contains a nominal sum signal frequency, the location of which is denoted by an arrow. Per nominal sum signal frequency three adjoining measuring regions are shown which have been associated with the relevant sum signal frequency. The nominal sum signal frequencies associated with the same beat signal frequency are spaced at least two measuring regions apart, with the result that the measuring regions in which no nominal sum signal frequency is situated are associated with two nominal sum signal frequencies. For example, the measuring region $m_4$ for tone signals having a beat signal frequency of 60 Hz is associated with the nominal sum signal frequency of 720 Hz (denoted by an uninterrupted line in the said measuring region) as well as with the nominal sum signal frequency of 840 Hz (denoted by the broken line in this measuring region).

The choice of the boundaries between the measuring regions will be described in detail hereinafter with reference to the boundary between the measuring regions $m_3$ and $m_4$. This boundary is chosen such that $a < b$ for all tone signals whose sum signal frequencies are situated in the measuring region $m_4$ and which have the nominal sum signal frequency of 720 Hz. It was already demonstrated that it can be established with certainty that $a < b$ only if the ratio $a/b$ is equal to or smaller than 0.8 dB. This means that the detected sum signal frequency is already frequency-shifted with respect to the nominal sum signal frequency if it can be determined with certainty that $a < b$. Also to be taken into account are the frequency shifts caused by other causes already described. Therefore, the boundary between the measuring regions $m_3$ and $m_4$ is situated at a distance of 20 Hz from the nominal sum signal frequency 720 Hz.

Because of the fact that for $a < b$ the frequency shift is positive, this boundary is situated above the nominal sum signal frequency. As a result, for tone signals for which $a < b$, a region of 60 Hz is available, and for tone signals for which $a \geq b$ a region of approximately 120 Hz is available. The latter is desirable because, as was already demonstrated, the frequency shift for $a > b$ exceeds that for $b > a$ for the same absolute number of dB for the ratio $a/b$. It is to be noted that the sum signal frequencies associated with tone signals having a beat signal frequency of 300 Hz are not shown in the tables because these tone signals are unambiguously determined by the beat signal frequency.

The tables shown in the FIGS. 5a and 5b reveal that for $a$ much larger than $b$, the sum signal frequency associated with a nominal sum signal frequency (for example, 840 Hz) will be situated in the measuring region ($m_3$) of the sum signal frequency (720 Hz) which is situated two measuring regions lower. This sum signal frequency cannot be distinguished from the sum signal frequencies associated with the nominal sum signal frequency (720 Hz) in this lower measuring region ($m_3$) for which $a$ is approximately equal to $b$.

In order to prevent incorrect detection in such cases, in accordance with a further step taken according to the invention during the entire measuring time of 25 ms a count is made of the number of samples having an amplitude smaller than 0.30 times the amplitude of the sample having the highest amplitude received thus far and a count is made too of the number of samples having an amplitude smaller than 0.35 times the amplitude of the sample having the highest amplitude received thus far. Furthermore, upon detection of the tone signal frequencies of 540 – 900 Hz it is determined whether the total count of samples having amplitudes smaller than 0.35 times the amplitude of the sample having the highest amplitude received thus far exceeds 80, and it is determined for all other tone signal frequency combinations whether the counter number of samples having an amplitude smaller than 0.30 times the amplitude of the sample having the highest amplitude received thus far exceeds 70. If these conditions are not satisfied, the measurement is rejected as being incorrect.

This step will be described in detail with reference to the FIGS. 6 and 7.

FIG. 6 shows two different beat signals $S_{v1}$ and $S_{v2}$ from one given tone signal frequency combination. The beat signal $S_{v1}$ is associated with tone signals having the same amplitude, and the beat signal $S_{v2}$ is associated with tone signals of unequal amplitude, the sum of the amplitudes of the tone signals of both tone signal combinations being equal. FIG. 6 shows that the amplitude in the minimum of the beat signal is equal to the absolute value of the amplitude difference between the two tone signals. This means that samples situated in the vicinity of the minimum of the beat signal $S_{v2}$ are larger on the average than those situated in the vicinity of the minimum of the beat signal $S_{v1}$, and that the mean value of these samples is proportional to the amplitude difference between the tone signals. This property is utilized to distinguish tone signal frequency combinations having such a large amplitude difference that the sum signal frequencies are situated in the measuring region of a nominal sum signal which is not associated with the tone signal combinations and which is situated two measuring regions lower.

In FIG. 7 the number of samples having an amplitude smaller than 0.30 times the amplitude of the sample having the maximum amplitude received thus far, measured in a time of 25 ms, is plotted versus the difference in dB between the amplitudes of the tone signals used in the European MFC system. This Figure shows that for an amplitude difference of 7 dB, at which the said problems start to occur, at least 70 samples are counted. An exception to this measured curve is formed by the tone signal frequency combination of 540 – 900 Hz which has a shorter repetition pattern of the sample compared to the other combinations. For this tone signal frequency combination the optimum sample amplitude detection limit for an amplitude of 7 dB is 0.35 times the amplitude of the sample having the highest amplitude received thus far, and the number of samples to be counted in 25 ms then amounts to 80.

For the determination of the tone signals from the tables shown in the FIGS. 5a and 5b the beat signal frequency must also be known.

Determination of the beat signal frequency.

The beat signal frequency is determined by counting the number of dips of the beat signal during the measuring time of 25 ms. If the number of dips counted during this time amounts to 2–3, the beat signal frequency is 60 Hz; if the number amounts to 5–6, the beat signal frequency is 120 Hz; if the number amounts to 8–9, the beat signal frequency amounts to 180 Hz; if the number amounts to 11 or 12, the beat signal frequency is 240 Hz; if the number amounts to 14–15, the beat signal frequency is 300 Hz. In accordance with a further step taken according to the invention, a dip is determined by establishing whether a number of successively received samples having an amplitude smaller than a given part of the sample having the highest amplitude received thus far exceeds a predetermined value. The detection level formed by this part of the amplitude of the sample having the highest amplitude received thus far should be chosen to be so high that on the one hand in the dip of the beat signal a sufficiently large number of successive samples is detected to enable this dip to be distinguished from a number of successive samples having a low amplitude and occurring in the for this detection most unfavourable situation of the samples in the sum signal. On the other hand, the detection level should be chosen to be so low that no peaks in the beat signal are skipped in the for this detection most unfavourable situation of the samples in the sum signal. This condition cannot be satisfied for all tone signal frequency combinations and the maximum permissible amplitude difference between the two tone signals per MFC signal.

Therefore, for the detection level for the beat signal of the tone signals situated in the lower band use is made of an amplitude equalling 0.75 times the amplitude of the sample having the highest amplitude received thus far, whilst for the detection level for the beat signal of the tone signals situated in the higher band use is made of an amplitude equalling 0.70 times the amplitude of the sample having the highest amplitude received thus far.

The use of a different detection level per frequency band is possible in that in the time directly preceding the actual measuring time of 25 ms a band determination is effected as has already been described in detail for the sum signal determination. In spite of this choice, it is not possible to distinguish the 300 Hz beat signal from the 600 Hz sum signal in case of an unfavourable situation of the samples in the sum signal. In order to eliminate this drawback, in accordance with a further step according to the invention it is determined whether a 60 Hz beat signal is present in the time of 13 ms directly preceding the actual measuring time of 25 ms. This step is based on recognition of the fact that, as appears from the table of FIG. 2a or 5a, the 600 Hz sum signal freuqency can possibly be present when a 60 Hz beat signal frequency occurs, but that the 300 Hz beat signal frequency cannot occur in such a case, and that if a 60 Hz beat signal frequency is absent, the 600 Hz sum signal frequency cannot be present, whilst the 300 Hz beat signal frequency can possibly be present. The 60 Hz beat signal frequency is detected in the time of 13 ms directly preceding the actual measuring time of 25 ms by determining whether the number of successively received samples having an amplitude smaller than 0.75 times the amplitude of the sample having the highest amplitude received thus far is higher than 20. If this condition is satisfied, the predetermined value for the detection of a dip is adjusted to ten for the tone signal frequency combinations situated in the lower band, with the result that the 600 Hz sum signal frequency which is possibly present in this case is excluded from the detection. In all other cases the predetermined value amounts to five.

The described method of detecting sampled MFC signals is effected by means of the MFC receiver shown in FIG. 8 and incorporated, for example, in a telephone exchange. This receiver comprises a switching device 1 which is connected to a data trunk line 12 and which serves in a known manner, not shown, for connecting one incoming line, or for time-sequentially connecting a plurality of incoming lines, to the trunk line 12. The processing of the digital signal samples supplied by the incoming lines is effected under the control of a control unit 2 which despatches, via a program store 3 and a command trunk line 13-1; 13-2; control commands to devices 4 to 10 connected to the data trunk line 12, to a time monitoring device 11 and to itself. A level detection device 4, a comparison member 5, and a polarity analyser 6 supply condition signals, via a condition signal trunk line 14-1, to the control unit 2, the said condition signals being generated from the data signals derived from the trunk line 12. Similarly, a time monitoring device 11 supplies condition signals, via condition signal trunk line 14-2, to the control unit 2. The comparison member 5, a calculating unit 7, a measuring region device 8, a signal frequency analyser 9, and a data store 10 supply data signals to the data trunk line 12.

Every 125 $\mu$s a sample originating from one and the same incoming line is received. The MFC receiver generates this sample within 0.976 $\mu$s. As a result 128 incoming lines can be time-multiplex connected to the MFC receiver. However, each measurement covers a large number of samples. The data store 10 is adapted such that the data calculated on the basis of a sample received and necessary for the further detection are channel-wise stored therein. A storage device of this kind is known per se and will not be elaborated herein.

The operation of the MFC receiver is divided into phases $F_1$ to $F_{13}$, the phase sequence being described in detail with reference to a phase diagram given in FIG. 9. The phases F which can be assumed from a given phase are denoted by the uninterrupted lines and the arrows shown therein. The receiver is in the rest condition in phase $F_1$.

This phase is abandoned when the receiver is actuated by a central processing member, or processor, incorporated in the telephone exchange. FIG. 8 shows the signal frequency indicator 15 of this processor which stores this information in known manner for further processing. Upon actuation, a reference number is assigned to the receiver, after which the switching device 1 connects the receiver to an incoming line in a manner not shown.

In phase $F_2$ the receiver waits for a sample exceeding a given actuation level. After reception of such a sample, a change-over is made to phase $F_3$. There is a waiting period of 5 ms in this phase. This waiting period is necessary because the two tone signal frequencies of an MFC signal need not simultaneously arrive; this may be due, for example, to the non-simultaneous starting of the tone generators, to unequal switch-on phenomena, and to unequal delay times. After this waiting time, a change-over to phase $F_4$ is made. This phase, directly preceding the phase in which the actual detection is effected, has a duration of 13 ms.

As has already been explained, during this 13 ms the sample having the highest amplitude received in this time is selected; it is also determined whether the tone signals represented by the samples are situated in the higher or in the lower frequency band, and whether a beat signal of 60 Hz is present. After this 13 ms, a change-over is made to phase $F_5$. In this phase the predetermined value required for the determination of the dip of the beat signal is adjusted to 5 or 10 in accordance with the detected band and the presence or absence of a 60 Hz beat signal.

After that, a change-over is directly made to phase $F_6$. In this phase the actual signal detection takes place during 25 ms.

At the end of the 25 ms, a change-over is made to phase $F_7$ in which the analysis of the tone signal frequencies is effected, after which a change-over is made to phase $F_8$. In this phase the detected signal frequency combination, having the reference number as its address, is applied to the central processor.

During the phases $F_2$ to $F_7$ inclusive, the presence of the MFC signal to be selected is monitored by the time monitoring device 11. If disappearance of the signal is detected during one of these phases, a change-over is made from these phases to phase $F_{13}$. In the latter phase it is determined whether the duration of the signal interruption exceeds 7 ms. If the signal interruption has a duration of less than 7 ms, the original phase is returned to; if the duration of the interruption exceeds 7 ms, phase $F_2$ is returned to and the detection is started again.

After the detection result has been applied to the frequency indicator 15 of the central processor, the presence of the signal is monitored in phase $F_9$. Such signal monitoring is required because the MFC signalling system is a so-termed "forced" signalling system. This means that a signal must remain present until signal acknowledgement has been received from the other end. If a signal interruption is detected in phase $F_9$, a change-over is made to phase $F_{10}$. If the duration of the signal interruption is less than 7 ms, phase $F_9$ is returned to. However, if the signal interruption has a duration in excess of 7 ms, a change-over is made to phase $F_{11}$. In this phase the end of the signal is reported to the central processor, after which the receiver jumps to phase $F_{12}$. In dependence of an instruction supplied by the central processor, the receiver returns to the rest state of phase $F_1$, or is set directly to phase $F_2$. The way in which the central processor controls the succession of phases will be described with reference to the part of the central processor 2 and the program store 3 shown in FIG. 10.

The central control unit 2 comprises a phase control unit 20 having connected thereto, via control conductors 22 and 23, a phase register 21 and, via control conductors 25 and 26, a phase jump register 24. The contents of the phase register represent the phase in which the receiver operates. This phase information is applied on the one side, via conductor 27, to the phase control unit 20 and on the other side, via conductor 28 and a multiplexer 29, to a demultiplexer 32 of the program store 3. Part of the store 31 of this device 3 is reserved for the phase jump processing. The information contents of this part are the phase to which a change-over can be made from a given phase. This is phase $F_{13}$ for the phases $F_3$ to $F_7$, phase $F_9$ for the phase $F_{10}$, phase $F_2$ for the phase $F_{12}$, and $F_2$ again for the phase $F_{13}$. This information is applied by the store 31, via conductor 30, to the phase jump register 24 as soon as the relevant phase in which operation takes place is received as an address from the phase register 21. The phase jump register 24 is furthermore connected, via conductor 41, to the phase register 21, the phase register 21 being connected, via conductor 40, to the phase jump register 24.

The operation is as follows. In order to change-over at the end of a phase, for example, phase $F_3$, to the next phase, phase $F_4$, a first control signal is applied by the phase control unit 20, via control conductor 22, to the phase register 21. In reaction thereto, the phase register increases the phase contents by one. On the one side this new phase is reported, via a conductor 27, to the phase control unit 20, whilst on the other side this phase information is applied as an address to the program store 3. In reaction thereto the latter applies, via conductor 30, the phase to which a change-over must possibly be made, in this case phase $F_{13}$, as the change-over address to the phase jump register 24. The phase control unit 20 subsequently applies a second control signal, via conductor 25, to the phase jump register 24. In reaction thereto, the jump address supplied by the program store 3 is written in the phase jump register 24. If a signal interruption is then detected in a manner not shown, the phase control unit 20 supplies further control signals, via the conductor 23 and 26, to the registers 21 and 24. In reaction thereto, the information contents of these registers are changed via the conductors 41 and 40. These new contents of the phase register in the described manner cause the program store 3 to apply the next phase to which a changeover must be made to the phase jump register 24, this phase being $F_2$ in this example. The phase control unit 20, however, does not apply a second control signal to the phase jump register 24 before a period of 7 ms has expired.

If the signal is restored within these 7 ms, the phase control unit 20 applies control signals to the registers 21 and 24 via the conductors 23 and 26, with the result that the phase contents of these registers are changed. If the signal disappears for at least 7 ms, first the phase jump register 24 is instructed, via control conductors 25, to write the jump address offered by the program store 3, after which the command to change the contents is applied to the two registers 21 and 24.

The above description of the phase diagram given in FIG. 9 reveals that the signal detection is effected in the phases $F_4$ to $F_7$. Hereinafter, only the operation of the MFC receiver during these phases will be described.

After reception of a samply on input terminal 1, the devices 4 to 9 simultaneously carry out a number of instructions in the phases $F_4$ and $F_6$, and said instructions being separately described hereinafter.

Firstly, in the level detection device 4 the amplitude of the received sample ($A_{rec}$) is compared with the amplitude of the sample having the highest amplitude received thus far ($A_{max}$). In order to enable this comparison to the performed in a very short period of time, the level detection comprises a store having a large number of word locations of eight bits each. The address of a word location is formed by the bits of the sample received and the bits of the sample having the highest amplitude received thus far.

For the amplitude of the received sample $A_{rec}$ and the amplitude of the sample having the highest amplitude received thus far $A_{max}$, together constituting the address of the said word location, it is stored per word location whether or not these amplitudes satisfy the following conditions:

Is $A_{rec}$ smaller than 0.30 times $A_{max}$
Is $A_{rec}$ smaller than 0.35 times $A_{max}$
Is $A_{rec}$ smaller than 0.70 times $A_{max}$
Is $A_{rec}$ larger than 0.75 times $A_{max}$
Is $A_{rec}$ smaller than 0.83 times $A_{max}$
Is $A_{rec}$ larger than 0.93 times $A_{max}$
Is $A_{rec}$ larger than 1.00 times $A_{max}$ The first seven bits of a word stored in this word location indicate, by way of the logic values 1, which of these conditions is satisfied by the amplitude combination, and, by way of the logic values 0, which conditions are not satisfied by the amplitude combination. The eighth bit is used to indicate whether or not the largest time $t_{max}$ detected between two successive zero crossings is larger than 1.15 times the time measured between two successive zero crossings within which a maximum of the beat signal $t_{best\ time}$ is situated. The address bits of a word location in this case represent the bits of $t_{max}$ and of $t_{best\ time}$.

The number of bits representing the amplitude of a sample and the duration of a time amounts to seven, with the result that a number of two to the fourteenth power different addresses can be formed, and as many word locations are required in the store.

However, it is possible to use only 256 word locations by omission of irrelevant bits, inversions and combinations.

The information in the form of eight bits received in reply to an address, referred to hereinafter as conditions, are applied to the central control unit 2 via the condition trunk of line 14-1.

Under the control of the control unit 2, on the one hand the fact whether or not the conditions "is $A_{rec}$ larger than 0.93 times $A_{max}$" and "is $A_{re}$ larger than 1.00 times $A_{max}$" are satisfied is stored in store 10 as a maximum calculation parameter, and on the other hand the fact whether or not the conditions "is $A_{rec}$ smaller than 0.07 times $A_{max}$" and "is $A_{rec}$ smaller than 0.83 times $A_{max}$" is stored in dependence of the frequency band as a maximum level parameter.

Secondly, in the comparison device 5 the number of successively received samples which can be representative of a dip and which are denoted by $N_{dip}$ are compared with a given numerical value, referred to as envelope parameter. In phase $F_4$ this numerical value amounts to 20, and in phase $F_6$ it amounts to 10 and 5, respectively, in dependence of the fact whether or not the number $N_{dip}$ in phase $F_4$ exceeds the numerical value 20. The samples which are representative of a dip are the samples in phase $F_4$ which have an amplitude smaller than 0.75 $A_{max}$, and in phase $F_6$ they are the samples which, depending on the determination in phase $F_4$ whether the received signal frequencies are situated in the higher or the lower band, have an amplitide which is smaller than 0.70 $A_{max}$ or smaller than 0.75 $A_{max}$, respectively. This number $N_{dip}$ is registered in the data store 10 under the control of the control unit 2. The fact whether or not the number $N_{dip}$ exceeds the said numerical values is applied, via the condition trunk line 14-1, to the central control unit 2 in the form of a logic 1 or a logic 0 signal, respectively.

This unit 2 also registers the number of times $N_{total}$ that $N_{dip}$ is larger than said numerical value during the measuring time of 25 $\mu s$ in the data store 10, the said number $N_{total}$ being a measure for the beat signal frequency.

Thirdly, in the polarity analyser 6 the polarity of the received sample, referred to as new sample, is compared with the polarity of the directly preceding sample, referred to as old sample. The polarity of a sample is represented by a polarity bit preceding the seven amplitude bits. The comparison of the polarity bits is effected, for example, by a modulo-two counter provided in the polarity analyser 6. The equality or unequality of the said polarities is applied, via the condition trunk line 14-1, to the central control unit 2 in the form of a logic 1 signal or a logic 0 signal, respectively.

Fourthly, in the case of unequality of the polarities of the two successively received samples, the calculating unit 7 is started via the command trunk line 13-1. This calculating unit is shown in detail in FIG. 11.

In order to enable the calculations to be quickly performed in this calculating unit 7, this unit comprises a store 61. This store stores all feasible ratios of the amplitudes of a new sample and the sum of the amplitudes of an old sample and the new sample in a table in the form of numbers. The address of each ratio is formed by the bits of the new and the old sample. When these bits are applied to the input terminal 60, the store contents associated with this address are supplied via the conductor 62, and the inverse of these store contents is supplied via conductor 63. It is to be noted that the ratio between the amplitude of the old sample and the sum of the amplitudes of the old and the new sample has the inverse numerical value of the ratio between the amplitude of the old sample and the sum of the amplitudes of the old and the new sample.

The inverse store contents are applied to a period buffer 64 via conductor 63, the said period buffer 64 being formed by a part of the data store 10. The information contents stored in this period buffer 64 are saved until they are erased by newly received information.

The conductor 62 and the conductor 67, connected to an output of the period buffer 64, are connected to inputs of an add unit 65. Furthermore, via the data trunk line 12, input 66 of the add unit 65 receives a count $N_{period}$, registered in the data store 10 by the control unit 2, of the number of samples received between two successive polarity changes. When an address is applied to input terminal 60, the add unit 65 calculates the period time between two successive fictitious zero crossings, by summing the storage contents received via the conductor 62, the contents of the period buffer 64 received via conductor 67, before these contents are erased by newly received information, and the count $N_{period}$ which is received via input terminal 60 and which is increased by one and multiplied by the sample repetition frequency, and applies this calculated information in binary form to output terminal 68.

If it was established in phase $F_4$ that the signal frequencies are situated in the higher frequency band, the calculated ratio of the amplitude of the old or the new sample, respectively, divided by the sum of the amplitudes of the old and the new sample, must be corrected in the described manner. To this end, the calculating unit 7 is provided with a second store 69, the contents of which are the corrected values of the above ratios which are addressed by the values of these ratios supplied by the store 61 via conductor 62. If it is found during the detection in phase $F_4$ that the signal frequencies are situated in the higher band, the control unit 2 applies, in a manner not elaborated herein, the signals of conductor 62, via conductor 70, to the store 69 instead of to the add unit 65, the signals of conductor 63 then being blocked and the signals supplied via the conductors 71 and 72, representing the corrected signals of the conductors 62 and 63, being applied to the add unit 65 and the period buffer 64.

Via output terminal 73 of the calculating unit 7, the newly calculated period time is applied in binary form, via the data trunk line 12, to the comparison device 5 as well as to the level detection device 4.

Fifthly, during the duration of the newly calculated period time the level detection device 4 determines in the described manner whether or not a maximum of the beat signal has occurred.

If no maximum is detected, under the control of the control unit 2 the newly calculated period time is compared with the maximum period time $t_{max}$ measured thus far which is stored in the data store 10. For this puropse the comparison device comprises two registers which are not shown in the Figures and in each of which seven bits can be stored. In a first register the bits which have been non-destructively read from the data store 10 and which repersent the maximum time $t_{max}$ measured thus far are written, and in the second register the bits representing the newly calculated period time are written. Subsequently, the contents of the registers are compared. If the newly calculated period time is larger than the time $t_{max}$ measured thus far, the information of $t_{max}$ stored in the data store 10 is erased by the contents of the second register, and a logic 1 signal is applied as a condition signal to control unit 2. If the newly calculated period time is smaller than $t_{max}$, only a logic 0 signal is applied to the control unit 2.

If a maximum of the beat signal has occurred during the newly calculated period time, the following operation is performed.

When the MFC receiver is in phase $F_4$, the period time is compared in the comparison device 5 with a value in the order of 390.5 $\mu s$ permanently stored in a third register in order to determine whether the received signal frequencies are situated in the higher or in the lower frequency band. The newly calculated period time written in the second register is compared therewith, and when the contents of the second register are or are not larger than the contents of the third register, a logic 1 or 0 signal, respectively, is applied to the control unit 2. This logic signal is stored as a lower-band parameter in the data store 10 under the control of the unit 2.

When the MFC receiver is in phase $F_6$, the newly calculated period time is compared with the $t_{best\ time}$ stored in the data store 10. To this end, the $t_{best\ time}$ stored in the data store 10 is non-destructively read and is applied, via a multiplier which has a multiplication factor 0.8 and which is not shown, to the first register. The newly calculated period time written in the second register is compared with the contents of the first register. If the contents of the second register are smaller than the contents of the first register, the information of $t_{best\ time}$ stored in the data store 10 is erased by the contents of the second register, and the logic 1 signal is applied as a condition to the control unit 2. If the contents of the second register are larger than the contents of the first register, only a logic 0 signal is applied to the control unit 2.

Sixthly, upon reception of a logic 1 signal due to a new time $t_{max}$ or a new time $t_{best\ time}$, the control unit 2 gives a command to apply the bits stored in the data store 10 which are representative of the time $t_{best\ time}$ or the time $t_{max}$ to the level detection device 4. Together with the bits supplied by the calculating unit 7 via output terminal 73, representative of the newly calculated period time, these bits constitute the address of a new time combination which is submitted to the level detection device 4 which determines, in the described manner, whether or not the relevant combination satisfies the condition stored in the eighth bit of each word.

Seventhly, if a maximum of the beat signal occurs during the newly calculated period time, under the control of the control unit the bits available on output 68 of the calculating unit 7, representative of the newly calculated period time, are applied to the measuring region unit 8. The store 74 of this unit 8, shown in FIG. 11, contains a table. The contents of this table are the measuring regions addressed by the bits of the newly calculated period time. The signals applied to the output 75, representative of the measuring region associated with the said newly calculated period time, are applied to the data store 10. In this store the number of times that given measuring regions are detected during the measurement are registered.

Eighthly, it is decided whether or not the measurement is valid. This is effected by comparing, under the control of the control unit 2, the counts stored in the data store 10 of the total number of samples received having amplitudes smaller than 0.3 or 0.35 times $A_{max}$, respectively, in the comparison device 5 with a fixed numerical value 70 or 80, respectively. The exceeding or non-exceeding of these numerical values is applied in the form of a logic 1 or 0 signal, respectively, to the central control unit 2 via the condition trunk line 14-1. It is also tested whether more than two different measuring regions have been detected.

Ninthly, the signal frequency combination is determined in the frequency analyser 9. To this end, the analyser 9 comprises a store which also contains a table. The contents of this table are the signalling frequency combinations, the address being the beat signal frequency, the measuring region, and the information denoting whether during the measurement at least once the condition "is $A_{max}$ larger than 1.15 times $t_{best\ time}$" has been satisfied in order to correct or not correct the detected measuring region according to the invention.

The condition signals supplied by the devices 4, 5 and 6 during or after the instructions are applied, via the condition trunk line 14-1, to inputs 29-1 to 29-N of the multiplexer 29 of the central control unit 2 as shown in FIG. 10. The central control unit processes these condition signals group-wise, each group consisting of at the most four condition signals. Because each condition signal is one bit, 16 different condition signal combinations are feasible per group.

In a part of the store 31 of the program storage device 3 sixteen word locations are reserved per group of condition signals, one of the condition signal combinations being assigned as an address to each word location. The contents of each word location are the actions to be performed by the control unit 2 for the said special combination of condition signals. There are 11 groups of condition signals to be processed during the phases $F_4$ to $F_7$. The distribution of the groups over the phases is shown in the phase diagram of FIG. 9, the groups being denoted by $G_1$ to $G_{11}$.

In order to select the desired group per phase in the storage device and in order to select the desired condition signals per group by the mulitplexer 29, the central control unit 2 comprises, as is shown in FIG. 10, a group address register 34 which is controlled by the phase control unit 20. The group address register 34 is connected on the one side, via conductor 35, to a demultiplexer 33 of the store 31 in order to select the group whose address is stored in the register 34, and is connected on the other side to a control input of the mulitplexer 29 for selecting the conditions associated with the said group. The register 34 is furthermore connected to a control input of a demultiplexer 36, connected to the output of the store 31, for selecting the action signal outputs from the outputs 36-1 to 36-$p$ associated with the said group. As appears from the phase diagram of FIG. 9, from the phases $F_3$ to $F_7$ a jump can be made only to phase $F_{13}$. In phase $F_3$ this phase jump address is written in the phase jump register 24 as has already been described. Because this phase jump information is retained in the phase jump register 24 during the phases $F_3$ to $F_7$, the locations reserved for the phase jump information in the part of the store 31 are released. These locations are used for storing the first group Gr (referred to as start group) of the said phases. This is group $Gr_1$ for phase $F_4$, group $Gr_3$ for phase $F_5$, group $Gr_4$ for phase $F_6$, and group $Gr_{10}$ for phase $F_7$. Furthermore, the store part in which the phase jump information is stored is addressed by the group address zero. The input of the group address register 34 is connected to the conductor 30 connected to the output of the store 31.

The operation is as follows.

In the rest position the group address register 34 contains the group address zero. In this position, on the one side group zero is selected via demultiplexer 33, and on the other side the phase of the phase register 21 is applied, via conductor 28 and the multiplexer 29, to the condition address input of demultiplexer 32. The phase jump address and the start group address are applied in reaction thereto, via conductor 30, to the phase jump register 24 and the group address register 34, respectively. In the latter case the phase control unit 20 will supply a control command via conductor 39, with the result that the group address is written in the group register 34. Via demultiplexer 33, this group address selects the relevant storage group and controls the multiplexer 29 such that the conditions associated with the said group are applied to the demultiplexer 32. This demultiplexer applies the conditions to the selected storage group. Furthermore, the group address controls the demultiplexer 36 such that the outputs of the demultiplexer 34 are selected on which the store 31 supplies the action signals associated with the selected group.

One of the actions of a group which is not the last group of a phase F, is that the next group must be proceeded with. If this action signal is received via the demultiplexer 36 on input terminal 19 of the phase control unit 20, the latter supplies a control signal to the group address register 34 via conductor 37. The group address in this register 34 is then increased by one, after which the working cycle of the said group is completed etc. The last group of a phase does not contain this action signal. The absence of this action signal causes, upon reception of a new sample, the groups of the said phase to be completed again. This is continued until the time monitoring device 11, monitoring the timing associated with the said phase, supplies a signal to the phase control unit 20 at the end of this timing, the said unit increasing the phase in the phase register 21, via conductor 22, by one step and supplying, via conductor 38, a control signal to the group address register 34, with the result that the group zero is written in this register, after which the working cycle of the next phase is completed.

The conditions arranged per group and the associated actions are given in the following tables. Behind the instructions the condition signal combinations supplied by the devices 2, 4, 5 and 6 are groupwise arranged in columns. The actions supplied by the store 31 in the case of one of these combinations are denoted by crosses in the same column in which the condition signals are stated.

The operation of the MFC receiver is fully determined by the phase control and group control and the instructions, condition signals and actions stated in the below decision tables and by the already described parameters.

| Phase $F_4$ Group GR1 | Conditions |
|---|---|
| Is $A_{rec}$ sample larger than 0.75 $A_{max}$ | 000011111111 |
| Is $A_{rec}$ sample smaller than $A_{max}$ | 001100001111 |
| Is polarity new sample not equal to polarity old sample | 010100110011 |
| Is the number $N_{dip}$ larger than 20 | ----01010101 |
| | Actions |
| Increase the number $N_{dip}$ by one | xxxx |
| Make $A_{max} = A_{rec}$ and make max. calculation parameter one | xx xxxx |
| Increase counting position $N_{period}$ by one | x x xx xx |
| Make the number $N_{dip}$ equal to zero | xxxxxxxx |
| Increase group number by one | x x xx xx |
| Make envelope parameter one | x x x x |

| Phase $F_4$ Group GR2 | Conditions |
|---|---|
| Does the calculating unit operate | 0111 |
| Is the maximum calculation parameter equal to one | -011 |
| Is the newly calculated period smaller than 390.5 | --01 |
| | Actions |
| Start the calculating unit | x |
| Make maximum calculation parameter zero | xxxx |
| Make lower-band parameter one | x |
| Make lower-band parameter zero | x |

| Phase $F_5$ Group GR3 | Conditions |
|---|---|
| Is lower-band parameter equal to one | 0011 |
| Is envelope parameter equal to one | 0101 |
| | Actions |
| Make envelope parameter 5 | xxx |
| Make envelope parameter 10 | x |

| Phase $F_6$ Group GR4 | Conditions |
|---|---|
| Is $A_{rec}$ sample smaller than $A_{max}$ | 000011111111 |
| Is $A_{rec}$ sample larger than 0.93 $A_{max}$ | ----00001111 |
| Is $A_{rec}$ sample smaller than 0.35 $A_{max}$ | 001100110011 |
| Is $A_{rec}$ sample smaller than 0.30 $A_{max}$ | 010101010101 |
| | Actions |
| Make $A_{max} = A_{rec}$ | xxxx |
| Make maximum parameter equal to one | xxxx xxxx |
| Increase group number by one | xxxxxxxxxxxx |
| Increase number of samples counted with $A_{rec} > 0.35 A_{max}$ by one | xx xx xx |
| Increase number of samples counted with $A_{rec} > 0.30 A_{max}$ by one | x x x x x x |

| Phase $F_6$ Group GR5 | Conditions |
|---|---|
| Is lower-band parameter equal to one | 00-10-11 |
| Is $A_{rec}$ larger than 0.70 $A_{max}$ | 011-11-- |
| Is $A_{rec}$ larger than 0.83 $A_{max}$ | --11-110 |
| Is maximum level parameter equal to one | -000111- |
| | Actions |
| Make envelope parameter zero | x x |
| Increase group number by one | xxxxxxxx |
| Make number envelope parameter one | xxx |
| Make minimum calculation parameter one | xxx |

| Phase $F_6$ Group GR6 | Conditions |
|---|---|
| Is lower-band parameter equal to one | 00-10-11 |
| Is $A_{rec}$ larger than 0.70 $A_{max}$ | 011-11-- |
| Is $A_{rec}$ larger than 0.75 $A_{max}$ | --11-110 |
| Is number $N_{dip}$ larger than envelope parameter | -000111- |
| | Actions |
| Increase the number $N_{dip}$ by one | x x |
| Increase group number by one | xxxxxxxx |
| Make the number $N_{dip}$ zero | xxxxxx |
| Increase the number $N_{total}$ by one | xxx |

| Phase $F_6$ Group GR7 | Conditions |
|---|---|
| Is polarity sample not equal to polarity old sample | 011 |
| Does the calculating unit operate | -01 |
| | Actions |
| Increase counting position $N_{period}$ by one | x |
| Make minimum level parameter zero | xx |
| Start the calculating unit | x |
| Make maximum calculation parameter zero | x |
| Increase group number by one | |

| Phase $F_6$ Group GR 8 | Conditions |
|---|---|
| Is the maximum calculation parameter equal to one | 00111 |
| Is newly calculated period time larger than $t_{max}$ | 01--- |
| Is $t_{best\ time}$ equal to zero | --0-1 |
| Is new period time smaller than 0.8 $t_{best\ time}$ | --01- |
| | Actions |
| Make max. calculation parameter zero | xxx |
| Increase group number by one | xxx |
| Make $t_{best\ time}$ equal to newly calculated period time | xx |
| Make $t_{max}$ equal to the newly calculated period time | x |

| Phase $F_6$ Group GR9 | Conditions |
|---|---|
| Are contents measuring region buffer 1 equal to zero | 00001 |
| Are contents measuring region buffer 1 equal to measuring region | 0-10- |
| Are contents measuring region buffer 2 equal to zero | 00-10 |
| Are contents measuring region buffer 2 equal to measuring range | 01--- |
| | Actions |
| Make measuring region detection parameter one | x |
| Write the measuring region in measuring region buffer 1 | x |
| Write the measuring region in measuring region buffer 2 | x |

| Phase $F_7$ Group GR10 | Conditions |
|---|---|
| Is measuring range detection parameter 1 | 01 |
| | Actions |
| Increase group number by one | x |
| Measurement incorrect | x |

| Phase $F_7$ Group GR11 | Conditions |
|---|---|
| Answer measuring region 1 equal to measuring region 2 | 01111 |
| Beat frequency 180 Hz | -0011 |
| Is number of samples counted $A_{rec} > 0.30 A_{max}$ | |

-continued

| | |
|---|---|
| larger than 70 | -01- |
| Is number of samples counted $A_{rec} > 0.35 A_{max}$ | |
| larger than 80 | —01 |
| | Actions |
| Measurement incorrect | xx x |
| Determine signal frequency combination | x x |

An example of a further application of the MFC receiver according to the invention is the detection of multi-frequency code signals which are received in sampled form and which are used for register signalling in the United States. This signalling is effected by means of two of a group of six tone signal frequencies situated within the speech band. These tone signal frequency combinations are given in the table of FIG. 12. The number given at the beginning of each row of the table denotes the beat signal frequency, and the number given above each column of the table denotes the sum signal frequency of the signal frequency (combinations) stated in the relevant row and column.

The processing of the samples is effected in a manner similar as described above for the tone signal frequencies situated in one of the bands of the signal frequencies used in a number of European countries. However, all said numerical values (referred to hereinafter as special numerical values) such as those, for example, of the conditions stated for the comparison of the amplitude of a newly received sample with the amplitude of the sample having the maximum amplitude received thus far, the numerical values of the predetermined values, the counter positions etc. are adapted to these tone signal frequencies. Furthermore, the band determination is cancelled, and for te determination of the beat signal frequencies the separation of the 500 Hz or the 700 Hz beat signal frequency from the 800 Hz or 900 Hz sum signal frequency, respectively, is obtained by determining, in the time directly preceding the actual measuring time, whether or not a 100 Hz or 200 Hz beat signal frequency is present, analogous to the separation of the 300 Hz beat signal frequency from the 600 Hz sum signal frequency by the determination of the presence or absence of a 60 Hz beat signal frequency for the tone signal frequency combinations ginven in FIG. 2a.

Figure 12:
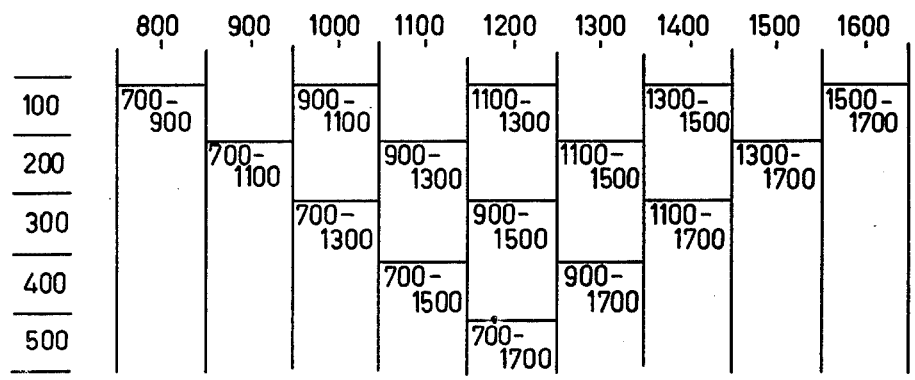

The tone signal frequency combinations given in FIG. 12 can thus be detected if the amplitude difference between the two tone signals does not exceed 4.5. dB per combination.

If tone signal frequency combinations having an amplitude difference between the two tone signals per combination of maximum 7 dB are to be detected, special numerical values must be chosen for the tone signal frequency combinations composed of tone signals of lower frequency other than for tone signal frequency combinations composed of tone signals of higher frequencies; this is analogous to the different numerical values chosen for the tone signal frequency combinations given in FIG. 2a and FIG. 2b.

Figure 13A:
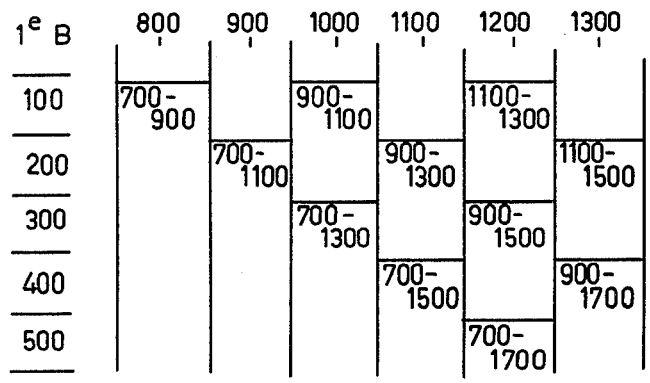
Figure 13:
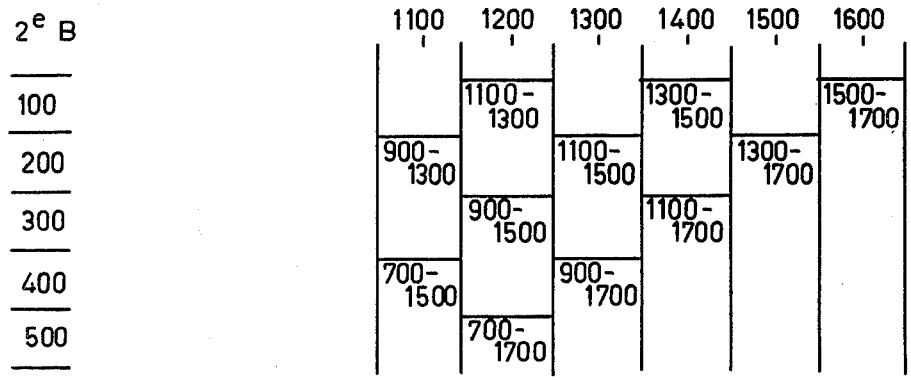

This is possible by dividing the tone signal frequency combinations given in FIG. 12 into a first and a second band such as is shown, for example, in the FIGS. 13a and 13b. The band determination is effected in the time directly preceding the actual measuring time in the same manner as described for the tone signal frequency combinations given in FIGS. 2a and 2b, the numerical value 390.5 μs being replaced by 416.7 μs. It is to be noted that the nominal sum signal frequencies shown in FIG. 12 are situated at a distance of 200 Hz from each other, with the result that the band determination of the sum signal frequencies in the vicinity of the 1200 Hz is not unambiguous. However, it is not important whether such a sum signal frequency is detected as belonging to the first or to the second band, because in that case on the one hand the numerical values which are specific of each band are chosen such that all sum signal frequencies belonging to the relevant band can be distinguished, and because on the other hand the measuring region unit 8 and the signal frequency analyser 9 are adapted such that they comprise the measuring regions and signal frequency combinations per band as given in the FIGS. 13a and 13b, respectively.

A further application of the MFC receiver is the detection of tone signal frequency combinations which are used in tone push button selection signalling, in which tone signals received in analog form are first smapled in known manner before being applied to the MFC receiver in digital form.

What is claimed is:

1. A multi-frequency code receiver for determining at least two tone signals of a group of multi-frequency tone signals received in sampled form, comprising a combination of
   a. an electronic digital computer which is programmed such that the tone signal frequencies are determined by detection of the sum signal frequency and the beat signal frequency,
   b. a signal frequency indicator which is connected to the computer and which serves to record signals which are applied thereto by the computer and which are representative of the tone signal frequencies, and
   c. a switching device having connected thereto the computer in order to apply samples represented in digital form to the computer, characterized in that the computer is further programmed such that, upon reception of samples applied in digital form, the computer selects the sample having the highest amplitude received thus far, calculates the location of a fictitious zero crossing of the sum signal of each two successively received samples of different sign, calculates the times between successive zero crossings on the basis thereof, selects the longest time calculated thus far from the times calculated during a given measuring time, selects the times which are situated in the maxima of the beat signal, calculates a selected quotient of the longest time determined thus far and one of the selected times, and determines the sum signal frequency on the basis of the selected times in dependence of the fact whether or not the calculated quotient satisfies a predetermined first value.

2. A multi-frequency code receiver as claimed in claim 1, characterized in that the computer is further programmed such that the location of a fictitious zero crossing is calculated by dividing the sample repetition time into two portions which are directly proportional to the amplitudes of the successively received samples of different sign, that it calculates the times situated between two fictitious zero crossings by counting the number of samples received between each two successive times that two successive samples of different sign are received by multiplying this number increased by one by the sample repetition time, and by adding thereto the time portions which are proportional to the amplitudes of the second sample of the first time and the first sample of the second time of the two successive times that two successive samples of different sign are received.

3. A multi-frequency code receiver as claimed in claim 1, characterized in that the computer is further programmed such that the selection of the times situated in the maxima of the beat signal is effected in that the times are selected in which one sample is received whose amplitude is higher than a given first portion of the amplitude of the sample of the highest amplitude received thus far, or in which two samples are received whose amplitudes are higher than a given second portion of the amplitude of the sample having the highest amplitude received thus far.

4. A multi-frequency code receiver as claimed in claim 1, characterized in that the computer is further programmed such that during a given measuring time the computer counts the successively received samples whose amplitudes are lower than a given third portion of the amplitude of the sample having the maximum amplitude received thus far, that it counts the number of times that the counted number of successively received samples exceeds a given counting position, and that it determines the beat signal frequency on the basis of the number of times counted during the given measuring time.

5. A multi-frequency code receiver as claimed in claim 1 for use in a register signalling system in which the frequencies for signalling in the forward direction are 1380, 1500, 1620, 1740, 1860 and 1980 Hz, the frequencies for signalling in the return direction amounting to 540, 660, 780, 900, 1020 and 1140 Hz, the sample repetition frequency being 8 KHz.

6. A multi-frequency code receiver as claimed in claim 1, for use in a register signalling system in which the tone signal frequencies amount to 700, 900, 1100, 1300, 1500 and 1700 Hz, and in which the sample repetition frequency amounts to 8 KHz.

7. A multi-frequency code receiver as claimed in claim 5, characterized in that the computer is further programmed such that for the determination of the selected quotient used is made of the first selected time or of the selected time which is smaller than 0.8 times the first selected time.

8. A multi-frequency code receiver as claimed in claim 5, characterized in that the predetermined first value amounts to 1.15.

9. A multi-frequency code receiver as claimed in claim 5, characterized in that the computer is further programmed such that, if the predetermined value is not exceeded during the given measuring time, detected sum signal frequencies situated in a region of from +20 to +80 Hz above a nominal sum signal frequency are taken as belonging to the said nominal sum signal frequency and that, if the predetermined value is exceeded, detected sum signal frequencies situated in a region of from +20 to −100 Hz below a nominal sum signal frequency are taken as belonging to the said nominal sum signal frequency.

10. A multi-frequency code receiver as claimed in claim 5, characterized in that the computer is further programmed such that it determines, in a measuring time directly preceding the given measuring time, whether tone signals for signalling in the forward or the return direction are concerned, by determining whether or not the selected times situated between each two successive zero crossings are smaller than 390.5 $\mu$s.

11. A multi-frequency code receiver as claimed in claim 6, characterized in that the computer is further programmed such that it determines, in a time directly preceding the given measuring time, whether the tone signals are situated in a first or in a second frequency band by determining whether or not the selected times between each two successive zero crossings are smaller than 416.7 $\mu$s.

12. A multi-frequency code receiver as claimed in claim 10, characterized in that the given first portion is the 0.93 multiple and the given second portion is the 0.70 multiple of the amplitude of the sample having the maximum amplitude received thus far for tone signal frequencies used for signalling in the forward direction, the given second portion being the 0.83 multiple of the amplitude of the samples of maximum amplitude received thus far for tone signal frequencies used for signalling in the return direction.

13. A multi-frequency code receiver as claimed in claim 10, characterized in that the given third portion is the 0.70 multiple of the amplitude of the sample having the highest amplitude received thus far for tone signal frequencies used in the forward direction, and the 0.75 mulitple thereof for tone signal frequencies used in the return direction.

14. A multi-frequency code receiver as claimed in claim 5, characterized in that the computer is further programmed such that the computer determines, in the time directly preceding the given measuring time, whether or not a successive number of samples larger that 20 is received whose amplitude is smaller than the 0.75 multiple of the amplitude of the sample having the highest amplitude received thus far, and adjusts the given counting position to 10 or 5 in dependence thereof.

15. A multi-frequency code receiver as claimed in claim 14, characterized in that the given measuring time is 25 ms and that the time directly preceding the given measuring time is 13 ms.

16. A multi-frequency code receiver as claimed in claim 15, characterized in that if the counted number of times that the predetermined counting position is reached is:
2–3, the beat signal frequency is 60 Hz;
5–6, the beat signal frequency is 120 Hz;
8–9, the beat signal frequency is 180 Hz;
11–12, the beat signal frequency is 240 Hz;
14–15, the beat signal frequency is 300 Hz;

17. A multi-frequency code receiver as claimed in claim 10, characterized in that the computer is further programmed such that for tone signal frequencies used in the forward direction a correction is made on the time portions which is optimum for 1680 Hz.

18. A multi-frequency code receiver as claimed in claim 15, characterized in that the computer is further programmed such that during the given measuring time the computer counts the number of samples having an amplitude lower than 0.30 times the amplitude of the sample having the highest amplitude found thus far, and counts the number of samples having amplitudes smaller than 0.35 times the amplitude of the sample having the highest amplitude found thus far, the computer determining, in the case of an analysed tone signal frequency combination of 540–900 Hz, whether the counted number of samples having amplitudes smaller that 0.35 times the amplitude of the sample having the highest amplitude found thus far is larger than 80, and determining for all other tone signal frequency combinations whether the counted number of samples having an amplitude smaller than 0.30 times the amplitude of the sample having the highest amplitude found thus far is larger than 70, the computer deeming the measurement to be incorrect if the numbers counted are smaller.

* * * * *

UNITED STATES PATENT AND TRADEMARK OFFICE
CERTIFICATE OF CORRECTION

PATENT NO. : 3,976,843
DATED : August 24, 1976
INVENTOR(S) : ROBERT B. BUCHNER ET AL It is certified that error appears in the above–identified patent and that said Letters Patent are hereby corrected as shown below:

Column 1, line 36, "143-444" should be -- 434-444 --.
Column 2, line 58, "and" (first occurrence) should be --end--
Column 8, line 12, "tions." should be --tions,--
Column 9, line 58, "$b$" should be --$<b$--
Column 16, line 7, "samply" should be --sample--
line 9, "and" (second occurrence) should be --the--
line 64, "0.07" should be --0.70--
Column 23, line 35, "te" should be --the--
line 45, "ginven" should be --given--
Column 24, line 20, "smapled" should be --sampled--

Signed and Sealed this nineteenth Day of July 1977

[SEAL]

Attest:

RUTH C. MASON
Attesting Officer

C. MARSHALL DANN
Commissioner of Patents and Trademarks